United States Patent
Ramachandran et al.

(10) Patent No.: US 9,336,358 B2
(45) Date of Patent: May 10, 2016

(54) GRANTING PERMISSION IN ASSOCIATION WITH AN APPLICATION

(71) Applicant: Google Inc., Mountain View, CA (US)

(72) Inventors: Vinod Kumar Ramachandran, Sunnyvale, CA (US); Grace Kloba, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 240 days.

(21) Appl. No.: 14/225,384

(22) Filed: Mar. 25, 2014

(65) Prior Publication Data
US 2015/0281238 A1    Oct. 1, 2015

(51) Int. Cl.
*G06F 21/00*    (2013.01)

(52) U.S. Cl.
CPC ..................... *G06F 21/00* (2013.01)

(58) Field of Classification Search
CPC ............. G06F 21/00; G06F 21/30–21/46; G06F 21/62–21/629
See application file for complete search history.

(56) References Cited

U.S. PATENT DOCUMENTS

| | | | |
|---|---|---|---|
| 8,935,755 B1* | 1/2015 | Kay | G06F 8/61 726/1 |
| 2008/0301701 A1* | 12/2008 | Khijniak | G06F 21/57 719/311 |
| 2012/0220263 A1 | 8/2012 | Smith et al. | |
| 2013/0054803 A1* | 2/2013 | Shepard | H04L 63/0884 709/225 |

FOREIGN PATENT DOCUMENTS

| | | |
|---|---|---|
| JP | 2013-020579 A | 1/2013 |
| KR | 10-2011-0116460 A | 10/2011 |
| KR | 10-2012-0101841 A | 9/2012 |
| KR | 10-1270445 B1 | 6/2013 |

OTHER PUBLICATIONS

Shehab et al., "ROAuth: Recommendation Based Open Authorization", Jul. 20-22, 2011, Symposium on Usable Privacy and Security, pp. 1-12.*

Sekar et al., "Avoidance of Security Breach through Selective Permissions in Android Operating System", Sep. 2012, ACM SIGSOFT Software Engineering Notes, vol. 37 No. 5, pp. 1-9.*

(Continued)

*Primary Examiner* — Matthew Smithers
(74) *Attorney, Agent, or Firm* — McDermott Will & Emery LLP (57) ABSTRACT

A system and method are provided for granting permission in association with an application, the method comprising accessing a website on an application running on an electronic device, the website comprising metadata, obtaining, from the metadata, a unique identifier of a native application, determining, based on the obtained unique identifier, that the native application is installed on the electronic device and that a permission is set in the native application, verifying, in response to the determination, that the native application corresponds to the website, and setting, in response to the verification, the permission for the website, wherein both the application and the native application allow for setting of the permission.

20 Claims, 5 Drawing Sheets

(56) References Cited

OTHER PUBLICATIONS

Liu et al., "Reconciling Mobile App Privacy and Usability on Smartphones: Could User Privacy Profiles Help?", Apr. 7-11, 2014, ACM, pp. 201-211.*

Chia et al., "Is this App Safe? A Large Scale Study on Application Permissions and Risk Signals", Apr. 16-20, 2012, ACM, pp. 311-320.*

* cited by examiner

GRANTING PERMISSION IN ASSOCIATION WITH AN APPLICATION

BACKGROUND

The present disclosure generally relates to applications, and in particular, to granting permission in association with an application (e.g., a native application).

An application may be a native application, which is designed to run on a computing device, such as a smartphone, a tablet computer, or a desktop computer. Typically, a computing device offers an array of native applications to a user. These native applications may be free or purchased through an application store and installed at the user's computing device.

SUMMARY

The disclosed subject matter relates to a system for granting permission in association with an application. The system comprises one or more processors, and a machine-readable medium comprising instructions stored therein, which when executed by the processors, cause the processors to perform operations comprising accessing a website on an application, the website comprising metadata. The operations further comprise obtaining, from the metadata, a unique identifier of a native application. The operations further comprise determining, based on the obtained unique identifier, that the native application is installed on the system and that a permission is set in the native application. The operations further comprise verifying, in response to the determination, that the native application corresponds to the website. In addition, the operations comprise setting, in response to the verification, the permission for the website.

The disclosed subject matter further relates to a computer-implemented method of granting permission in association with an application. The method comprises accessing a website on an application running on an electronic device, the website comprising metadata. The method further comprises obtaining, from the metadata, a unique identifier of a native application. The method further comprises determining, based on the obtained unique identifier, that the native application is installed on the electronic device and that a permission is set in the native application. The method further comprises verifying, in response to the determination, that the native application corresponds to the website. In addition, the method comprises setting, in response to the verification, the permission for the website, wherein both the application and the native application allow for setting of the permission.

The disclosed subject matter also relates to a machine-readable medium comprising instructions stored therein, which when executed by a system, cause the system to perform operations comprising accessing a website on an application running on an electronic device, the website comprising metadata. The operations further comprise obtaining, from the metadata, a unique identifier of a native application. The operations further comprise determining, based on the obtained unique identifier, that the native application is installed on the electronic device and that a permission is set in the native application. The operations further comprise verifying, in response to the determination, that the native application corresponds to the website. In addition, the operations comprise setting, in response to the verification, the permission for the website, wherein installation of the native application provides for display of a permissions dialog which indicates that the permission extends to the website.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, an application may be a native application, which is designed to run on a computing device, such as a smartphone, a tablet computer, or a desktop computer. Typically, a computing device offers an array of native applications to a user. These native applications may be free or purchased through an application store and installed at the user's computing device.

One feature of native applications is that they may grant permissions upon installation by the user, to access information associated with the device, for example, location, storage, camera, or microphone access. However, limitations associated with extending permissions from a native application to a website corresponding to the native application may negatively impact user experience on computing devices.

In some aspects, a website visited by a user may request location information of the computing device. A native application corresponding to the website may already be installed on the device and grant permission (e.g., granted upon installation) to location information of the computing device. However, permission to location information is not extended from the native application to the corresponding website. For example, an information bar may be displayed on the website to request permission to location information. Thus, redundant information (e.g., location permission requests) may be provided to the user. In addition, the user may need to perform an extra step to grant permission to the website.

The subject disclosure provides for granting permission in association with an application. A website comprising metadata is accessed on an application running on a system. The application may be a web browser. A unique identifier of a native application is obtained from the metadata included in the website. The metadata may comprise a metatag or HTML code for identifying the native application.

Based on the obtained unique identifier, a determination may be made that the native application is installed on the system and that a permission is set in the native application. In response to the determination, a verification can be made that the native application corresponds to the website. The verification that the native application corresponds to the website may be based on a determination that a domain of the website matches a preset domain of the native application. In response to the verification, the permission is set for the website.

Alternatively, or in addition, based on the obtained unique identifier, a determination may be made that the native application is not installed on the system or the permission is not set in the native application. In this case, the system refrains from setting the permission for the website.

A request to verify that the native application corresponds to the website may be transmitted to a server (e.g., a digital distribution platform for installing native applications). The request may include the obtained unique identifier. In response to the transmitted request, a verification that the native application corresponds to the website may be received from the server. Alternatively, or in addition, at least one of an operating system on the system or the native application on the system may be accessed to verify that the native application corresponds to the website.

The permission may include permission for accessing, processing and/or modifying information associated with the system. The permission may be for accessing a sensor of the system, for example, a location-based sensor, an audio sensor, a video sensor and/or a motion sensor. The permission may be set for activating one or more of the multiple sensors.

The permission may be automatically set upon installation of an original version of the native application on the system. Alternatively, or in addition, the permission may be automatically set upon installation of an updated version of the native application on the system. In example aspects, both the application and the native application are allowed to set the permission. Display of a permissions dialog which indicates that the permission extends to the website may be provided upon installation of the native application.

Figure 1:
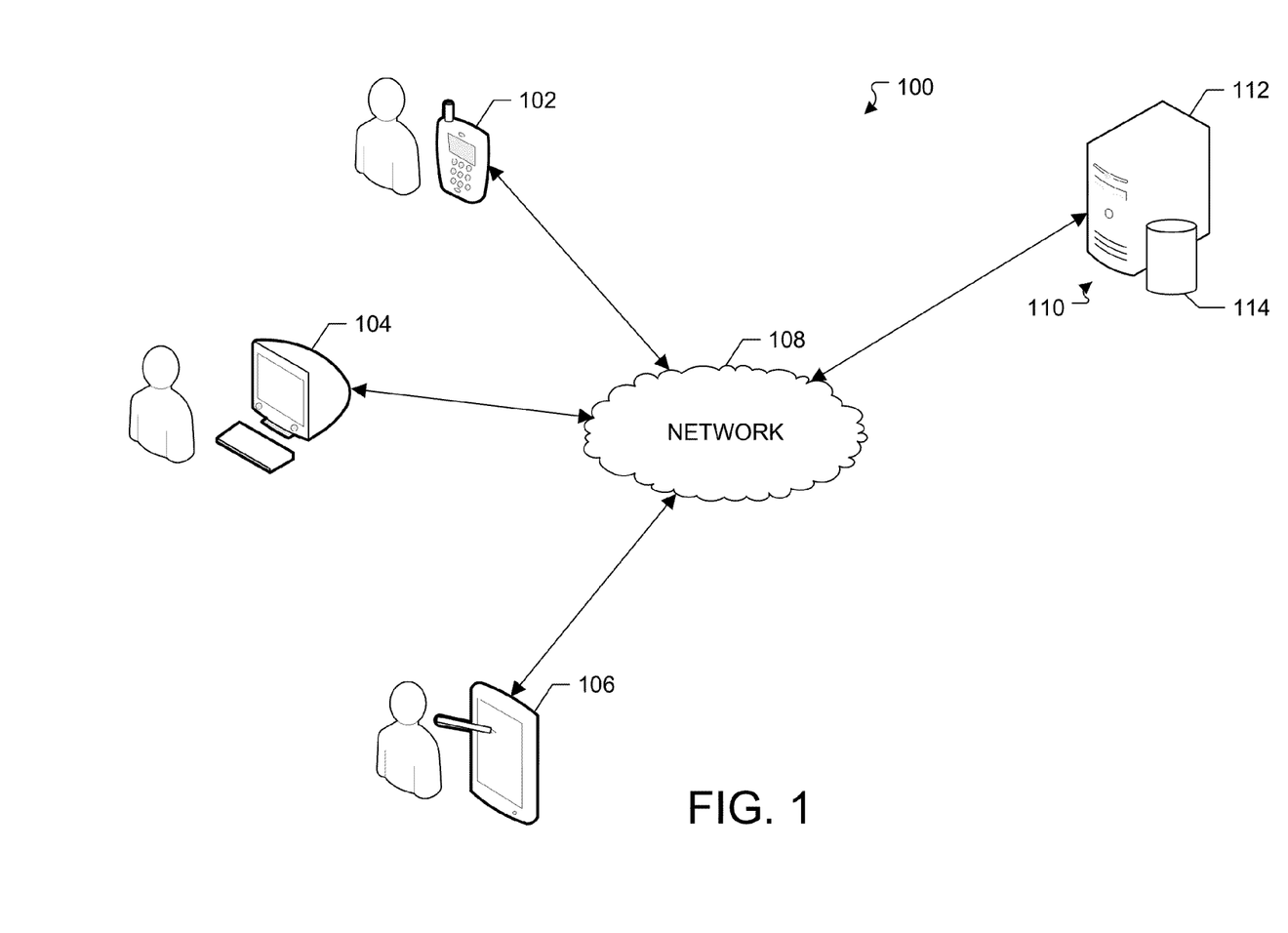
FIG. 1 illustrates an example network environment in which information can be provided for granting permission in association with an application.

FIG. 1 illustrates an example network environment in which information can be provided for granting permission in association with an application. A network environment 100 includes computing devices 102, 104 and 106 (hereinafter "102-106") and computing system 110 (hereinafter "110-112"). Computing devices 102-106 and computing system 110 can communicate with each other through a network 108. Computing system 110 can include one or more computing devices 112 (e.g., one or more servers), and one or more computer-readable storage devices 114 (e.g., one or more databases).

Each of computing devices 102-106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 112 may be provided access to or receive application software executed or stored on any of the other computing systems 102-106 and 112.

Computing device 112 may be any system or device having a processor, a memory, and communications capability for providing content to the electronic devices. In some example aspects, server 110 can be a single computing device, for example, a computer server. In other embodiments, server 110 can represent more than one computing device working together to perform the actions of a server computer (e.g., cloud computing). Further, computing device 112 can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., server 110) can occur via a virtual private network (VPN), Secure Shell (SSH) tunnel, or other secure network connection. In some aspects, network 108 may further include a corporate network (e.g., intranet) and one or more wireless access points.

In example aspects, server 110 may be a digital distribution platform for native applications which can provide information associated with one or more native applications installed the client device (e.g., any of computing devices 102-106). Information associated with a native application may include a name, a matching website domain, one or more social annotations, one or more user ratings, and/or a price of the native application. For example, processing device 112 executes computer instructions stored in data store 114, for example, to provide information associated with a native application installed on the client device. Information associated with a native application installed on the client device may be retrieved by an application programming interface (API) of a digital distribution platform for native applications.

In example aspects, the client device (e.g., any of computing devices 102-106) provides for granting permission in association with an application. A website comprising metadata is accessed on an application running on the client device (e.g., any of computing devices 102-106). The application may be a web browser. A unique identifier of a native application is obtained from the metadata. The metadata may comprise a metatag or HTML code for identifying the native application. Based on the obtained unique identifier, a determination may be made at the client device that the native application is installed on the client device and that a permission is set in the native application.

In response to the determination, the native application corresponds to the website is verified. The verification that the native application corresponds to the website may be based on a determination that a domain of the website matches a preset domain of the native application. The determination may be made at a server (e.g., server 110) or the client device. In response to the verification, the permission is set for the website. Alternatively, based on the obtained unique identifier, a determination may be made that the native application is not installed on the client device or the permission is not set in the native application. In this case, the client device refrains from setting the permission for the website.

A request to verify that the native application corresponds to the website may be transmitted to a server (e.g., server 110). The request may include the obtained unique identifier. In response to the transmitted request, a verification that the native application corresponds to the website may be received from the server. Alternatively, or in addition, at least one of an operating system on the client device or the native application on the client device may be accessed to verify that the native application corresponds to the website.

Figure 2:
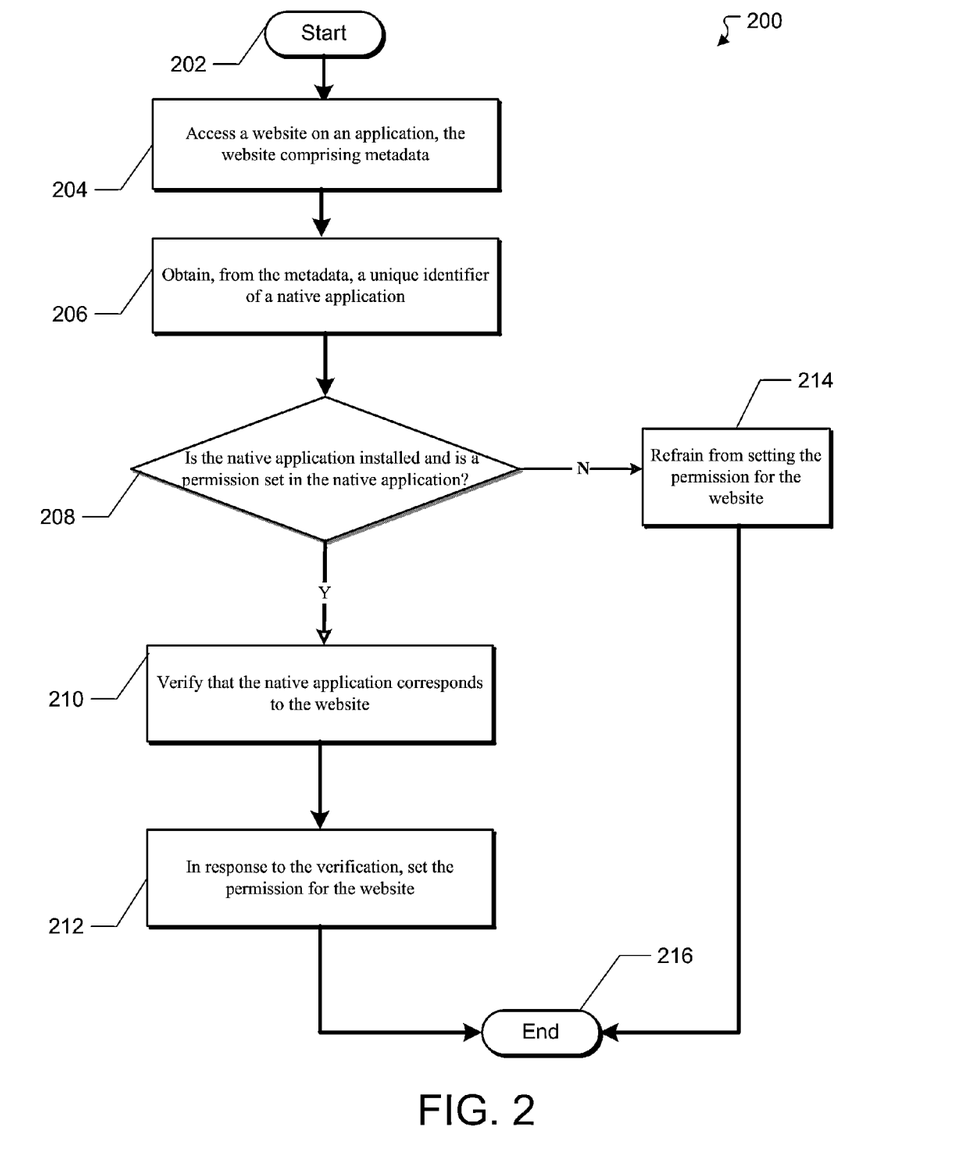
FIG. 2 illustrates a flow diagram of an example process for granting permission in association with an application.

FIG. 2 illustrates a flow diagram of an example process for granting permission in association with an application. Following start block 202, a website is accessed on an application on a system, the website comprising metadata, at block 204. The application can be a web browser application. In some aspects, metadata included in the website contains at least a unique identifier, such as a package name of a native application. Metadata can be a meta tag or HTML code for identifying a native application, for example, in the form of <meta name="operatingsystem-app" package_name="com.nativeappname.operatingsystem">, which may be added by a website developer to serve as a native application indicator for the website. At block 206, a unique identifier of a native application is obtained from the metadata.

At decision block 208, based on the unique identifier, the system determines if the native application is installed on the system and that a permission is set in the native application. In some aspects, the determination may be made by the application (e.g., web browser application) on the system. The application on the system may request permission information associated with the native application (e.g., permission set for the native application) from an operating system on the system.

The permission may include permission for accessing, processing and/or modifying information associated with the system. In some aspects, the permission may be for accessing, processing and/or modifying the states and/or configurations of the system (e.g., phone status, battery states, network states, Wi-Fi configurations). In example aspects, the permission may be for accessing, processing and/or modifying the services provided for the system (e.g., print service, text message service, remote services, and voicemails). In some implementations, the permission may be for accessing, processing and/or modifying data on the system. For example, the permission may be for accessing social information on the system (e.g., contacts, calendar).

Alternatively, or in addition, the permission may be for accessing and/or configuring one or more hardware peripherals associated with the system. In some implementations, the permission may be for accessing, modifying and/or deleting contents of an external storage and/or removable storage associated with the system. In some aspects, the permission may be for pairing with Bluetooth devices (e.g., pairing the system with another device via Bluetooth). In example aspects, the permission may be for accessing a sensor of the system, for example, a location-based sensor, an audio sensor, a video sensor and/or a motion sensor. The permission may be for activating one or more of the multiple sensors.

In some aspects, the permission may be set in the native application at the time of installation of the native application, as will be described in greater detail below with reference to FIG. 3. Alternatively or in addition, the permission may be granted to the native application during the operation of the native application (e.g., post-installation). For example, a native application (e.g., a map application) may request location permission when the user is trying to look for map directions.

At decision block 208, if it is determined that the native application is installed on the system and that a permission is set in the native application, a verification is made that the native application corresponds to the website at block 210.

The verification may include comparing the information associated with the native application and the information associated with the website. In some aspects, at least one common owner and/or developer of the native application and the website may be identified. In example aspects, the verification may include verifying two mappings including a first and second mapping. The first mapping may be a mapping from the website to the native application. For example, the website developer may indicate a native application corresponding to the website via the metadata on the website. As noted above, metadata can be a meta tag or HTML code for identifying the native application, for example, in the form of <meta name="operatingsystem-app" package_name="com.nativeappname.operatingsystem">, which may be added by a website developer to serve as the native application indicator for the website. The native application may be identified by a unique identifier, such as the package name in the metadata. The second mapping may be a mapping from the native application to a website. For example, a domain of a website may be determined to match a preset domain of the native application. The preset domain of the native application may be specified by the application developer(s).

In some implementations, the first mapping may be verified before the second mapping is verified. In some aspects, the second mapping may be verified before the first mapping is verified. Alternatively, in addition, the first mapping and the second mapping may be verified at the same, or substantially the same (e.g., within a preset duration), time.

In some aspects, the application (e.g., web browser application) on the system may query an application programming interface (API) of a digital distribution platform for applications to verify the native application corresponds to the website. A request to verify that the native application corresponds to the website may be transmitted to a server (e.g., server 110). The request may include the obtained unique identifier. In response to the transmitted request, a verification that the native application corresponds to the website may be received from the server. Alternatively, or in addition, a request to verify that the native application corresponds to the website may be transmitted to at least one operating system or the native application on the system. The request may include the obtained unique identifier. In response to the transmitted request, a verification that the native application corresponds to the website may be received from the at least one operating system or the native application on the system.

At block 212, in response to the verification determined at block 210, the system sets the permission for the website. In example aspects, both the application on the system discussed in block 204 and the native application corresponds to the website are allowed to set the permission. In some implementations, the permission may be automatically set upon installation of an original version of the native application on the system. Alternatively, or in addition, the permission may be automatically set upon installation of an updated version of the native application on the system. As noted above, the permission may be granted to the native application during the operation of the native application (e.g., post-installation). In some aspects, the permission may be automatically set for the website after installation of the native application.

A notification may be provided on the system to indicate that the permission may be automatically set upon installation of an updated version of the native application on the system. The notification may be provided to the user during updating an operating system on the system (e.g. terms of service has changed). Display of a permissions dialog which indicates that the permission extends to the website may be provided upon installation of the native application.

In some aspects, the permission may be set in the application on the system. The system may refrain from setting the permission for the website if the permission is not set in the application on the system discussed in block 204. Extension of the permission to the website may be stored in the settings of the application on the system discussed in block 204. The permission may be revoked by the application discussed in block 204 if the native application corresponds to the website is uninstalled on the system after the permission for the website is set.

Otherwise, if at decision block 208 it is determined that the native application is not installed on the system or that a permission is not set in the native application, the system refrains from setting the permission for the website at block 214. The process then ends at end block 216.

Figure 3:
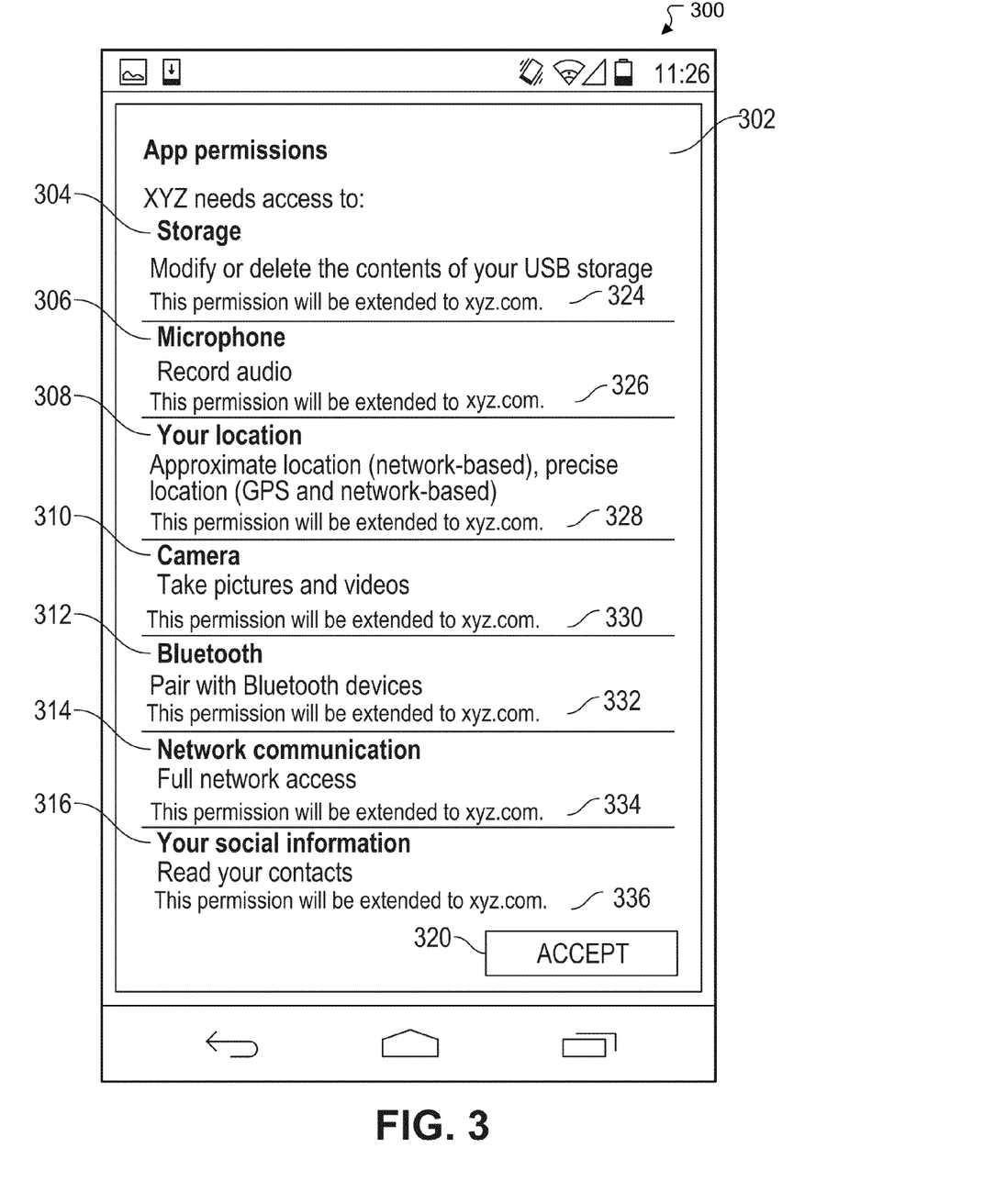
FIG. 3 illustrates an example user interface of granting permissions in association with an application.

FIG. 3 illustrates an example user interface of granting permissions in association with an application. For example, user interface 300 may be provided upon installation of an application on a computing device (e.g., computing device 102 of FIG. 1). User interface 300 may be provided in association with a server (e.g., server 110 of FIG. 1) that can be a digital distribution platform for native applications. User interface 300 may include a permissions dialog which indicates one or more permissions extended to a website. However, user interface 300 is not limited thereto.

User interface 300 includes an application permissions dialog field 302. Application permissions dialog field 302 displays one or more permissions requested by an application "XYZ" on the computing device. As noted above, the one or more permissions may include permissions for accessing, processing and/or modifying information associated with the system. In the example of FIG. 3, application permissions dialog field 302 includes a storage permission area 304, a microphone permission area 306, a location permission area 308, a camera permission area 310, a Bluetooth permission area 312, a network communication permission area 314, and a social information permission area 316. Storage permission area 304 displays permission to storage including, but not limited to, modifying or deleting the contents of the external storage associated with the computing device. Microphone permission area 306 displays permission to microphone including, but not limited to, recording audio on the computing device. Location permission area 308 displays permission to location information including, but not limited to, accessing network-based approximate location information and/or GPS and network-based precise location information. Camera permission area 310 displays permission to camera including, but not limited to, taking pictures and videos. Bluetooth permission area 312 displays permission to Bluetooth devices including, but not limited to, pairing with Bluetooth devices. Network communication permission area 314 displays permission to network communication including, but not limited to, full network access. Social information permission area 316 displays permission to social information including, but not limited to, reading contacts information on the computing device.

Application permissions dialog field 302 further includes a storage permission extension area 324 corresponding to storage permission area 304, a microphone permission extension area 326 corresponding to microphone permission area 306, a location permission extension area 328 corresponding to location permission area 308, a camera permission extension area 330 corresponding to camera permission area 310, a Bluetooth permission extension area 332 corresponding to Bluetooth permission area 312, a network communication permission extension area 334 corresponding to network communication permission area 314, and a social information permission extension area 336 corresponding to social information permission area 316. Each of permission extension area 324 to 336 displays that the corresponding permission in permission area 304 to 316 will be extended to xyz.com. In some aspects, the website of xyz.com may be verified to correspond to the application "XYZ" as described in FIG. 2.

In addition, application permissions dialog field 302 includes an accept button 320. The user may accept and commit the one or more permissions and permission extensions displayed in application permissions dialog field 302, by selecting accept button 320 (e.g., tap on accept button 320).

While FIG. 3 illustrates seven permissions (e.g., displayed in permission area 304 to 316), the subject technology is not limited thereto, and can apply to other multiples of permissions, as well as to groupings of different permissions. Alternatively, or in addition, while FIG. 3 illustrates seven permission extensions (e.g., displayed in permission extension area 324 to 336), the subject technology is not limited thereto, and can apply to other multiples of permission extensions, as well as to groupings of different permission extensions.

Figure 4:
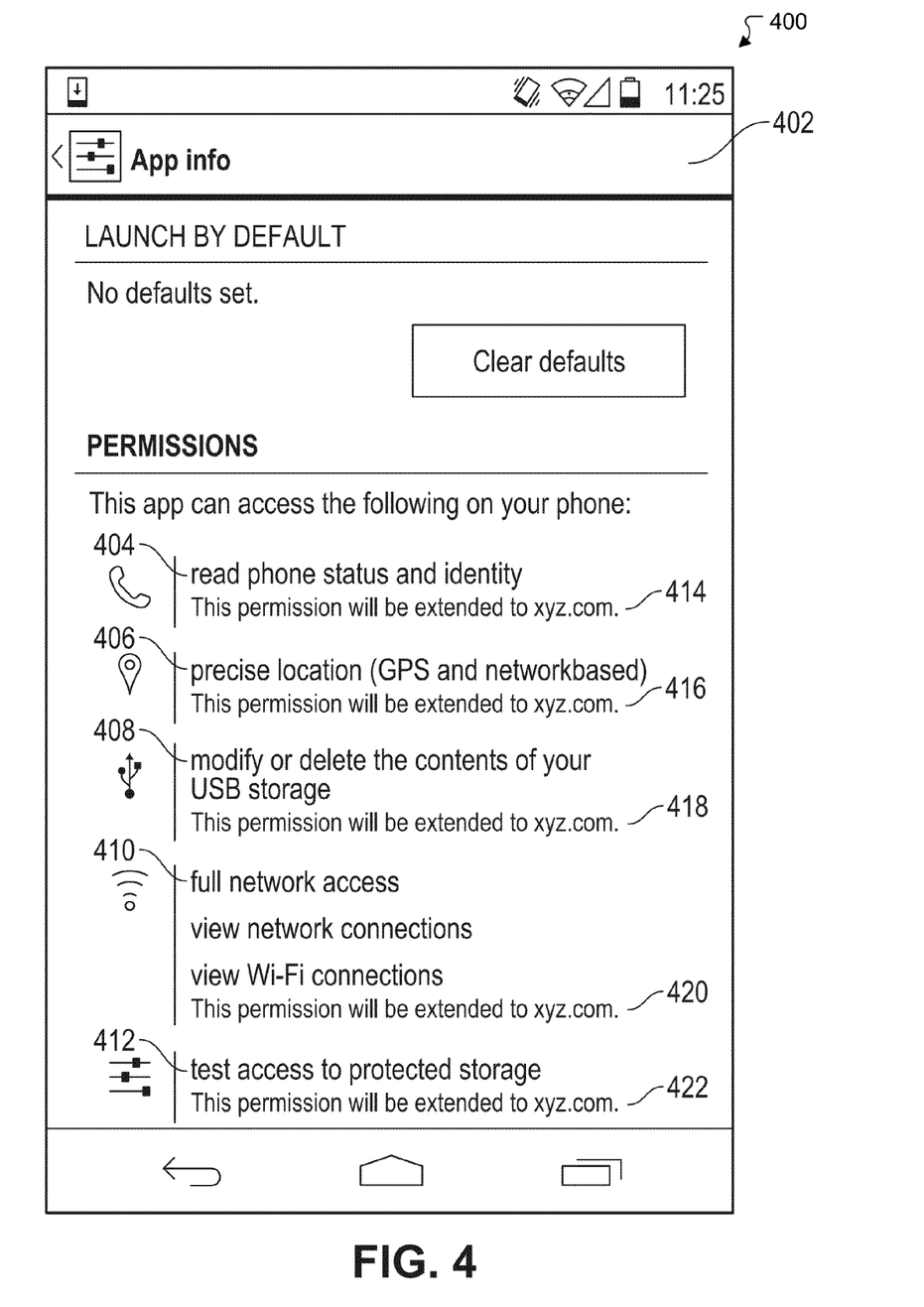
FIG. 4 illustrates an example user interface of displaying permissions in association with an application.

FIG. 4 illustrates an example user interface of displaying permissions in association with an application. For example, user interface 400 may be provided in association with an installed application on a computing device (e.g., computing device 102 of FIG. 1). User interface 400 may be provided in association with a server (e.g., server 110) that can be a digital distribution platform for native applications. However, user interface 400 is not limited thereto.

User interface 400 includes an application information field 402. Application information field 402 displays information including, but not limited to, one or more permissions granted to an application (e.g., application "XYZ"). One or more permissions may be granted upon installation of the application, as described in FIG. 3. Application information field 402 includes a permission area 404, a permission area 406, a permission area 408, a permission area 410 and a permission area 412.

Permission area 404 displays permission to the states of the computing device, for example, to read status and identity of the computing device. Permission area 406 displays permission to location information, such as GPS and/or network-based location precise location information. Permission area 408 displays permission to external storage associated with the computing device, for example, to modify and/or delete the contents of the USB storage associated with the computing device. Permission area 410 displays permission to full network access of the computing device, for example, to view network connections and/or Wi-Fi connections associated with the computing device. Permission area 412 displays permission to protected storage of the computing device, for example, to test access to protected storage associated with the computing device.

In addition, application information field 402 includes a permission extension area 414 corresponding to permission area 404, a permission extension area 416 corresponding to permission area 406, a permission extension area 418 corresponding to permission area 408, a permission extension area 420 corresponding to permission area 410, and a permission extension area 422 corresponding to permission area 412. Each of permission extension area 414 to 422 displays that the corresponding permission in permission area 404 to 412 will be extended to xyz.com. The website of xyz.com may be verified to be corresponding to the application associated with user interface 400 as described in FIG. 2.

While FIG. 4 illustrates five permissions (e.g., displayed in permission area 404 to 412), the subject technology is not limited thereto, and can apply to other multiples of permissions, as well as to groupings of different permissions. Alternatively, or in addition, while FIG. 4 illustrates five permission extensions (e.g., displayed in permission extension area 414 to 422), the subject technology is not limited thereto, and can apply to other multiples of permission extensions, as well as to groupings of different permission extensions.

Figure 5:
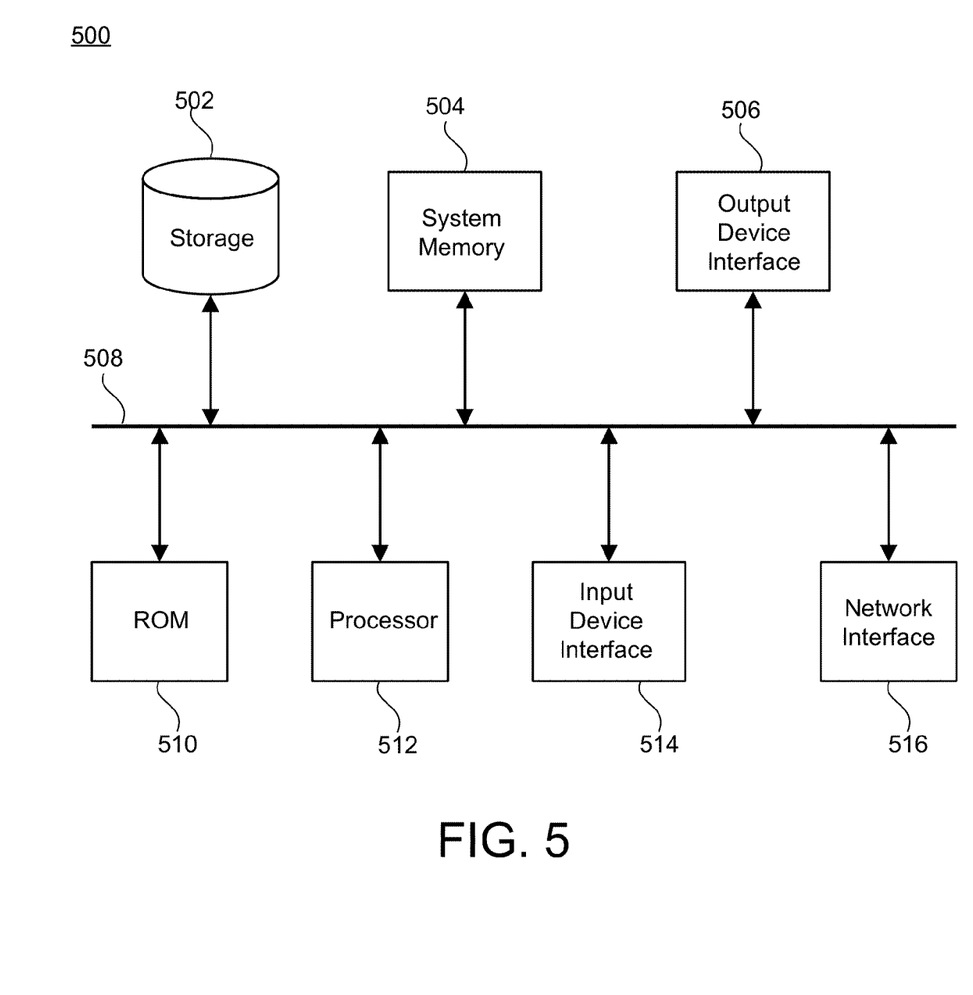
FIG. 5 conceptually illustrates an example electronic system with which some implementations of the subject technology can be implemented.

FIG. 5 conceptually illustrates an example electronic system with which some implementations of the subject technology can be implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (for example, a magnetic or optical disk and its corresponding disk drive) as permanent storage device 502.

Other implementations use a removable storage device (for example, a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, or ROM 510. For example, the various memory units include instructions for granting permissions in association with an application in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, for example, cathode ray tubes (CRT) or liquid crystal displays (LCD). Some implementations include devices, for example, a touchscreen that functions as both input and output devices.

Finally, as shown in FIG. 5, bus 508 also couples electronic system 500 to a network (not shown) through a network interface 516. In this manner, the computer can be a part of a network of computers (for example, a local area network ("LAN"), a wide area network ("WAN"), or an Intranet, or a network of networks, for example, the Internet. Any or all components of electronic system 500 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A system for granting permission in association with an application, the system comprising:
   one or more processors; and
   a machine-readable medium comprising instructions stored therein, which when executed by the processors, cause the processors to perform operations comprising:
      accessing a website on an application, the website comprising metadata;
      obtaining, from the metadata, a unique identifier of a native application;
      determining, based on the obtained unique identifier, that the native application is installed on the system and that a permission is set in the native application;
      verifying, in response to the determination, that the native application corresponds to the website; and
      setting, in response to the verification, the permission for the website.

2. The system of claim 1, wherein the verification that the native application corresponds to the website is based on a determination that a domain of the website matches a preset domain of the native application.

3. The system of claim 1, wherein the system further comprises multiple sensors, and wherein the permission is for activating one or more of the multiple sensors.

4. The system of claim 3, wherein the multiple sensors include at least one of a location-based sensor, an audio sensor, a video sensor or a motion sensor.

5. The system of claim 1, wherein the permission is automatically set upon installation of an original version of the native application on the system.

6. The system of claim 1, wherein the permission is automatically set upon installation of an updated version of the native application on the system.

7. The system of claim 1, the operations further comprising:
   determining, based on the obtained unique identifier, that the native application is not installed on the system or that the permission is not set in the native application; and
   refraining, based on the determination that the native application is not installed on the system or that the permission is not set in the native application, from setting the permission for the website.

8. The system of claim 1, wherein both the application and the native application allow for setting of the permission.

9. The system of claim 1, wherein installation of the native application provides for display of a permissions dialog which indicates that the permission extends to the website.

10. The system of claim 1, wherein the application is a web browser.

11. The system of claim 1, wherein the verifying comprises:
    transmitting, to a server, a request to verify that the native application corresponds to the website, the request including the obtained unique identifier; and
    receiving, from the server and in response to the transmitted request, a verification that the native application corresponds to the website.

12. The system of claim 11, wherein the server is a digital distribution platform for installing native applications.

13. The system of claim 1, wherein the verifying comprises:
    accessing at least one of an operating system on the system or the native application on the system to verify that the native application corresponds to the website.

14. The system of claim 1, wherein the metadata comprises a metatag or HTML code for identifying the native application.

15. A computer-implemented method of granting permission in association with an application, the method comprising:
    accessing a website on an application running on an electronic device, the website comprising metadata;
    obtaining, from the metadata, a unique identifier of a native application;
    determining, based on the obtained unique identifier, that the native application is installed on the electronic device and that a permission is set in the native application;
    verifying, in response to the determination, that the native application corresponds to the website; and
    setting, in response to the verification, the permission for the website,
    wherein both the application and the native application allow for setting of the permission.

16. The method of claim 15, wherein the verification that the native application corresponds to the website is based on a determination that a domain of the website matches a preset domain of the native application.

17. The method of claim 15, wherein the electronic device comprises multiple sensors, and wherein the permission is for activating one or more of the multiple sensors.

18. The method of claim 17, wherein the multiple sensors include at least one of a location-based sensor, an audio sensor, a video sensor or a motion sensor.

19. The method of claim 15, wherein the permission is automatically set upon installation of an original version of the native application on the electronic device.

20. A machine-readable medium comprising instructions stored therein, which when executed by a system, cause the system to perform operations comprising:
    accessing a website on an application running on an electronic device, the website comprising metadata;
    obtaining, from the metadata, a unique identifier of a native application;

determining, based on the obtained unique identifier, that the native application is installed on the electronic device and that a permission is set in the native application;
verifying, in response to the determination, that the native application corresponds to the website; and
setting, in response to the verification, the permission for the website,
wherein installation of the native application provides for display of a permissions dialog which indicates that the permission extends to the website.

* * * * *